United States Patent
Yamada et al.

(10) Patent No.: US 8,261,763 B2
(45) Date of Patent: Sep. 11, 2012

(54) TANK VALVE UNIT

(75) Inventors: Norihiro Yamada, Aichi-ken (JP);
Tomohisa Imaeda, Aichi-ken (JP);
Masanori Nojiri, Aichi-ken (JP)

(73) Assignee: Toyoda Gosei Co., Ltd., Aichi-pref (JP)

( * ) Notice: Subject to any disclaimer, the term of this patent is extended or adjusted under 35 U.S.C. 154(b) by 393 days.

(21) Appl. No.: 12/461,927

(22) Filed: Aug. 27, 2009

(65) Prior Publication Data

US 2010/0051114 A1    Mar. 4, 2010

(30) Foreign Application Priority Data

Aug. 29, 2008  (JP) .................................. 2008-221023

(51) Int. Cl.
*F16K 24/04*    (2006.01)
(52) U.S. Cl. ..................... 137/202; 137/43; 137/315.08
(58) Field of Classification Search .................. 137/202, 137/587, 588, 393, 356, 43, 315.08
See application file for complete search history.

(56) References Cited

U.S. PATENT DOCUMENTS

| | | | | |
|---|---|---|---|---|
| 4,989,629 | A * | 2/1991 | Shirakawa | 137/202 |
| 5,277,217 | A * | 1/1994 | Kobayashi et al. | 137/39 |
| 6,499,500 | B2 * | 12/2002 | Rosseel | 137/15.17 |
| 6,863,082 | B1 * | 3/2005 | McIntosh et al. | 137/202 |
| 6,932,103 | B2 * | 8/2005 | Iwamoto | 137/202 |
| 7,934,514 | B2 * | 5/2011 | Yamada | 137/202 |
| 8,042,564 | B2 * | 10/2011 | Ando et al. | 137/202 |
| 2005/0022869 | A1 * | 2/2005 | Beyer et al. | 137/202 |
| 2007/0084510 | A1 * | 4/2007 | Kaneko et al. | 137/202 |
| 2007/0144580 | A1 * | 6/2007 | Kaneko | 137/202 |
| 2007/0284001 | A1 * | 12/2007 | Yamada | 137/202 |
| 2007/0295403 | A1 * | 12/2007 | Kishi | 137/202 |
| 2008/0142087 | A1 * | 6/2008 | Muto et al. | 137/43 |
| 2009/0211649 | A1 * | 8/2009 | Miura et al. | 137/202 |
| 2009/0236350 | A1 * | 9/2009 | Miura | 220/745 |
| 2010/0071785 | A1 * | 3/2010 | Miura et al. | 137/429 |
| 2010/0200079 | A1 * | 8/2010 | Matsuzaki et al. | 137/202 |

FOREIGN PATENT DOCUMENTS

JP  A-01-301227  12/1989
JP  A-2006-70790  3/2006

* cited by examiner

*Primary Examiner* — John Rivell
*Assistant Examiner* — Minh Le
(74) *Attorney, Agent, or Firm* — Posz Law Group, PLC

(57) ABSTRACT

The tank valve unit includes a support body, and a fuel cutoff valve installed on the support body. The support body includes a mounting plate having a support engaged portion. The fuel cutoff valve has a casing in which a valve chamber is defined by a tubular casing body and a bottom cover installed in the bottom part of the casing body; and a float mechanism housed inside the valve chamber. The bottom cover has a first engaging portion adapted to attach to the casing body by engaging the casing body, and a second engaging portion adapted to secure to the mounting plate by engaging the support engaged portion.

2 Claims, 4 Drawing Sheets

TANK VALVE UNIT

This application claims the benefit of and priority from Japanese Application No. 2008-221023 filed Aug. 29, 2008, the content of which is incorporated herein by reference.

BACKGROUND OF THE INVENTION

1. Field of the Invention

The present invention relates to a tank valve unit having a fuel cutoff valve installed on a support body that is housed inside a fuel tank.

2. Description of the Related Art

In one known design for a tank valve unit of this kind, a fuel cutoff valve is installed on a support body by being attached through screw fastening, welding, or the like, for example see JP 1-301227 A. However, such prior art designs for attaching a fuel cutoff valve to a support body have the problems of an increased number of parts due to the need for screws, and of requiring a laborious operation for attaching or welding the components.

SUMMARY

An advantage of some aspects of the invention is to provide a tank valve unit whereby through a simple design a fuel cutoff valve can be attached to a support body situated inside a fuel tank.

According to an aspect of the invention is provided with a tank valve unit comprising a support body housed inside a fuel tank, and a fuel cutoff valve secured to the support body. The support body includes a mounting plate having a support engaged portion; the fuel cutoff valve has a casing in which a valve chamber is defined by a casing body and a bottom cover installed in the bottom part of the casing body; and a float mechanism adapted to rise or fall depending on the fuel level contained in the valve chamber. The bottom cover has a first engaging portion adapted to attach the bottom cover to the casing body by engaging a valve engaged portion of the casing body, and a second engaging portion adapted to secure the bottom cover to the mounting plate by engaging the support engaged portion.

The tank valve unit taught in this first mode is housed with the fuel cutoff valve secured to the support body. The fuel cutoff valve is attached to the support body after the float mechanism etc. have been housed in the valve chamber. Specifically, after housing the float mechanism in the valve chamber of the fuel cutoff valve, the first engaging portion of the bottom cover engages the valve engaged portion to attach the bottom cover to the casing body. Then, to attach the fuel cutoff valve to a housing portion of the support body, the second engaging portion of the fuel cutoff valve engages with the support engaged portion of the mounting plate of the housing portion. The fuel cutoff valve is secured thereby to the housing portion of the support body.

According to this first mode, the means for securing the fuel cutoff valve to the support body involves integrally forming on the bottom cover a first engaging portion adapted to engage the valve engaged portion of the casing body, and a second engaging portion adapted to engage the support engaged portion of the housing portion of the support body, that is, not only is the bottom cover provided with engaging means adapted to engage the casing body, but also with engaging means adapted to engage the housing portion, so that once the second engaging portion has been engaged with the support engaged portion of the housing portion, the fuel cutoff valve can be attached to the housing portion easily by a one-touch operation. Moreover, parts such as screws are not needed to secure the housing portion and the fuel cutoff valve, so there are fewer parts as well.

In a second mode of the present invention, the second engaging portion is a claw that is projected downward from the bottom cover; and the second engaged portion is a hole that is formed in the mounting plate and adapted to engage with the claw. That is, by forming the first and second engaging portions in a plate-shaped member like the bottom cover, even a readily flexed claw shape can be produced easily. These and other objects, features, aspects, and advantages of the present invention will become more apparent from the following detailed description of the preferred embodiments with the accompanying drawings.

BRIEF DESCRIPTION OF THE DRAWINGS

DESCRIPTION OF THE PREFERRED EMBODIMENTS (1) General Configuration of Fuel Tank Valve Unit FIG. 1 is a sectional view depicting an automobile fuel tank FT that employs a tank valve unit in accordance with an embodiment of the present invention. The fuel tank FT is formed by laminating several resin material layers, and is manufactured by a known art method, specifically, by extruding a tubular parison into a mold. A support body 10 and a fuel cutoff valve 20 are situated inside the fuel tank FT. The support body 10 is a member adapted for mounting the fuel cutoff valve 20, as well as to enhance the support structure of the fuel tank and to reduce fuel wave action. The fuel cutoff valve 20 is of so-called in-tank design, and is provided as a valve adapted to restrict outflow of fuel to the outside if the fuel level in the fuel tank FT rises when the vehicle tilts or when the vehicle turns sharply.

(2) Configuration of Support Body 10

Figure 1:
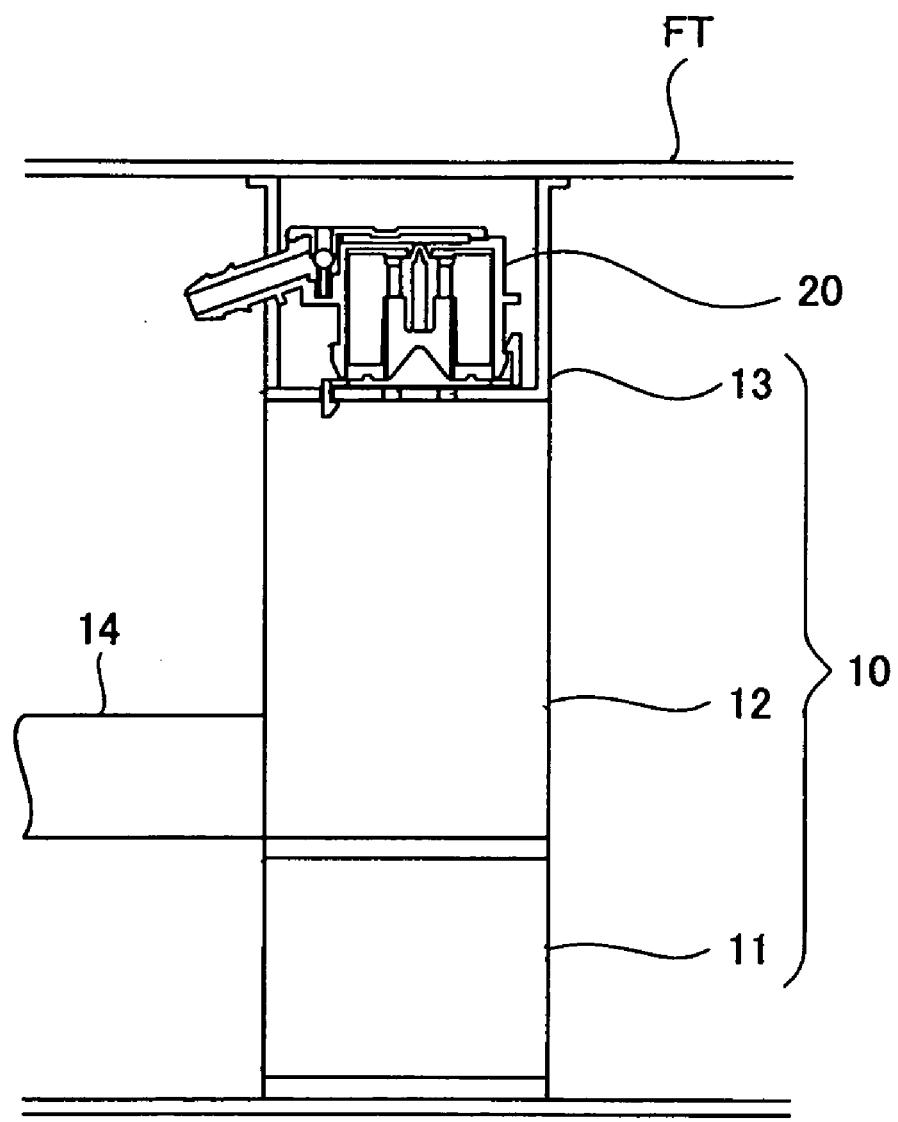
FIG. 1 is a sectional view depicting an automobile fuel tank that employs a tank valve unit in accordance with an embodiment of the present invention.
Figure 2:
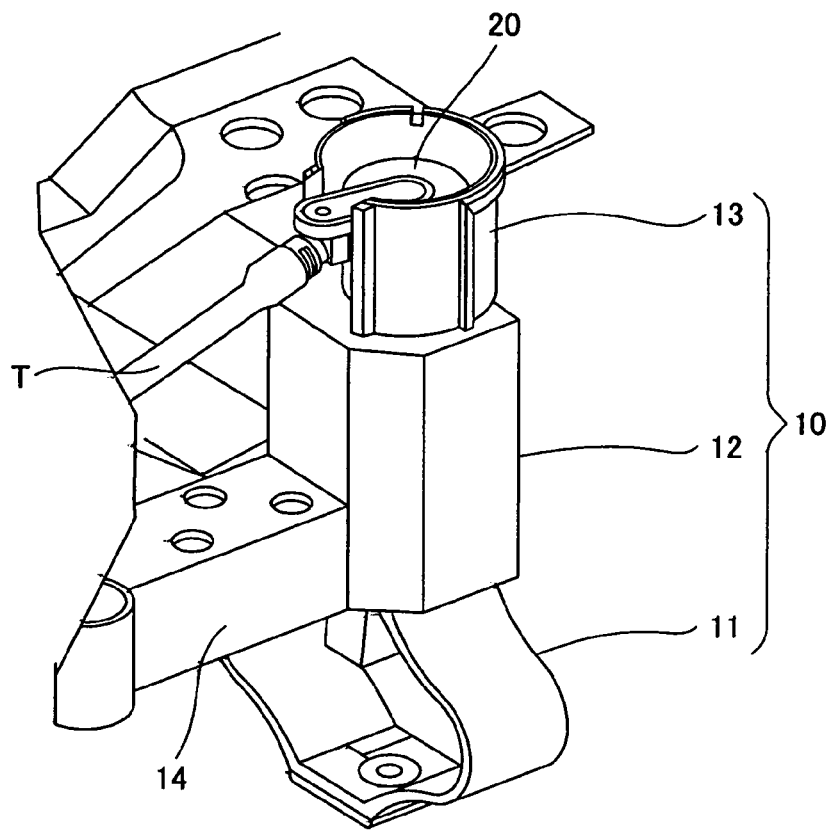
FIG. 2 is a perspective view showing part of the tank valve unit.

FIG. 2 is a perspective view showing part of the tank valve unit. The support body 10 includes a damper portion 11 that has been welded to the bottom wall of the fuel tank; a support post 12 formed on top of the damper portion 11; a housing portion 13 formed on top of the support post 12 and adapted to house the fuel cutoff valve 20; and a linking member 14 that is secured to the side of the support post 12 and positioned on the horizontal. The damper portion 11 is adapted to absorb expansion and contraction of the fuel tank, and to damp transmission of vibration of the fuel tank to the fuel cutoff valve 20.

Figure 3:
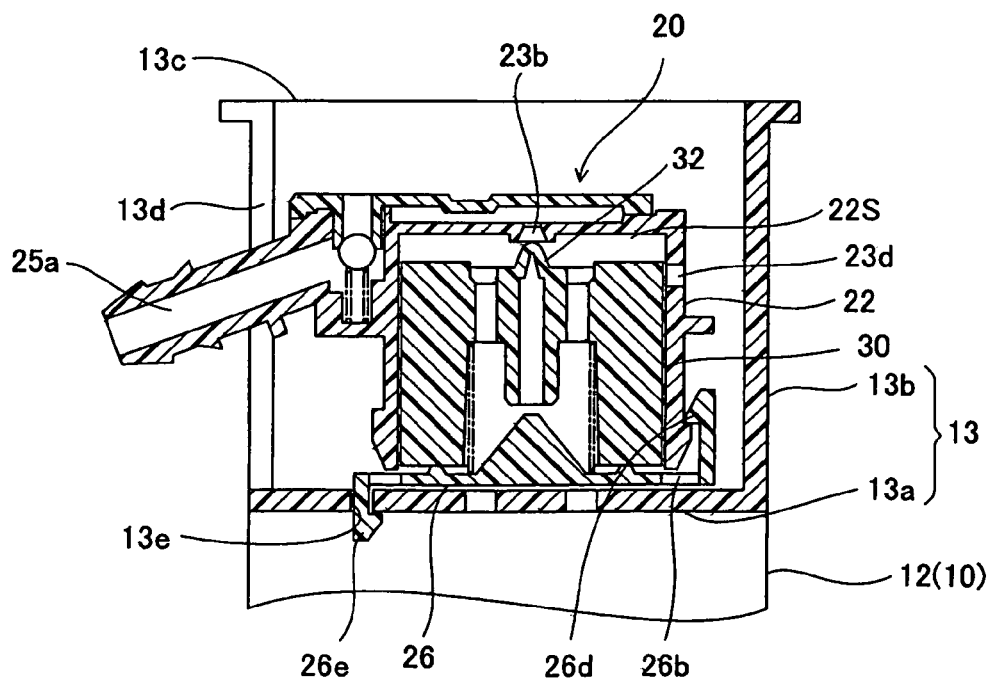
FIG. 3 is a sectional view depicting a fuel cutoff valve housed in a housing portion.

FIG. 3 is a sectional view depicting the fuel cutoff valve 20 housed in the housing portion 13. The housing portion 13 is a member of tubular shape adapted to secure the fuel cutoff valve 20, as well to cover the circumference of the fuel cutoff valve 20 in order to prevent wave action of the fuel from reaching the fuel cutoff valve 20; it includes a mounting plate 13a, and a side wall 13b projecting upward with tubular contours from the outside peripheral part of the mounting plate 13a. It is open at the top through an upper opening 13c, and open at the side through a side opening 13d formed in the side wall 13b.

(3) Configuration of Fuel Cutoff Valve 20

Figure 4:
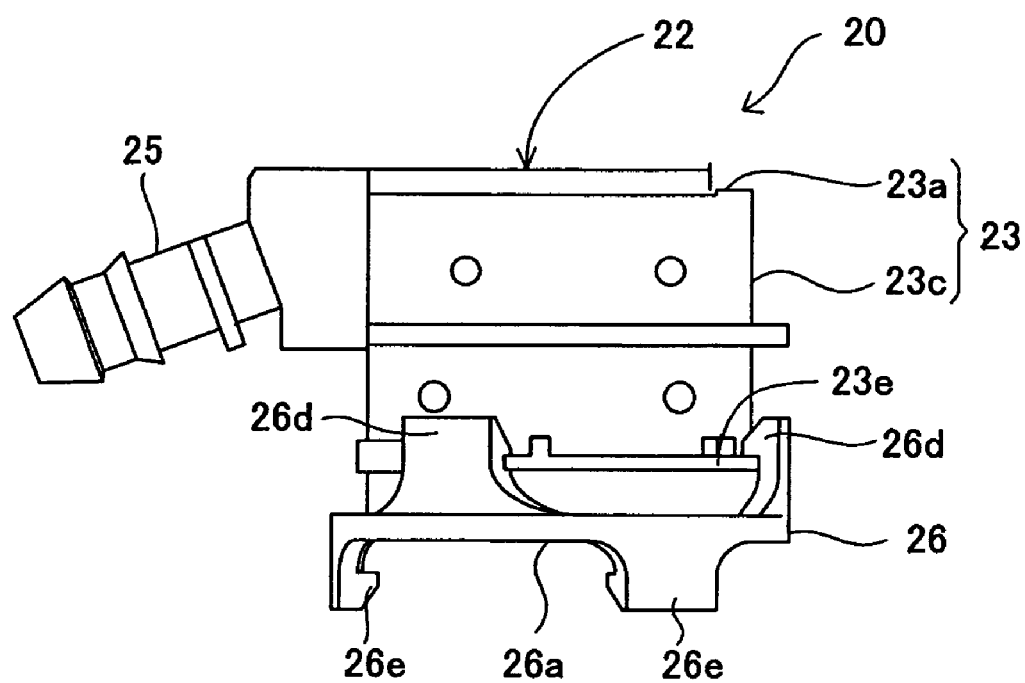
FIG. 4 is a side view depicting the fuel cutoff valve.
Figure 5:
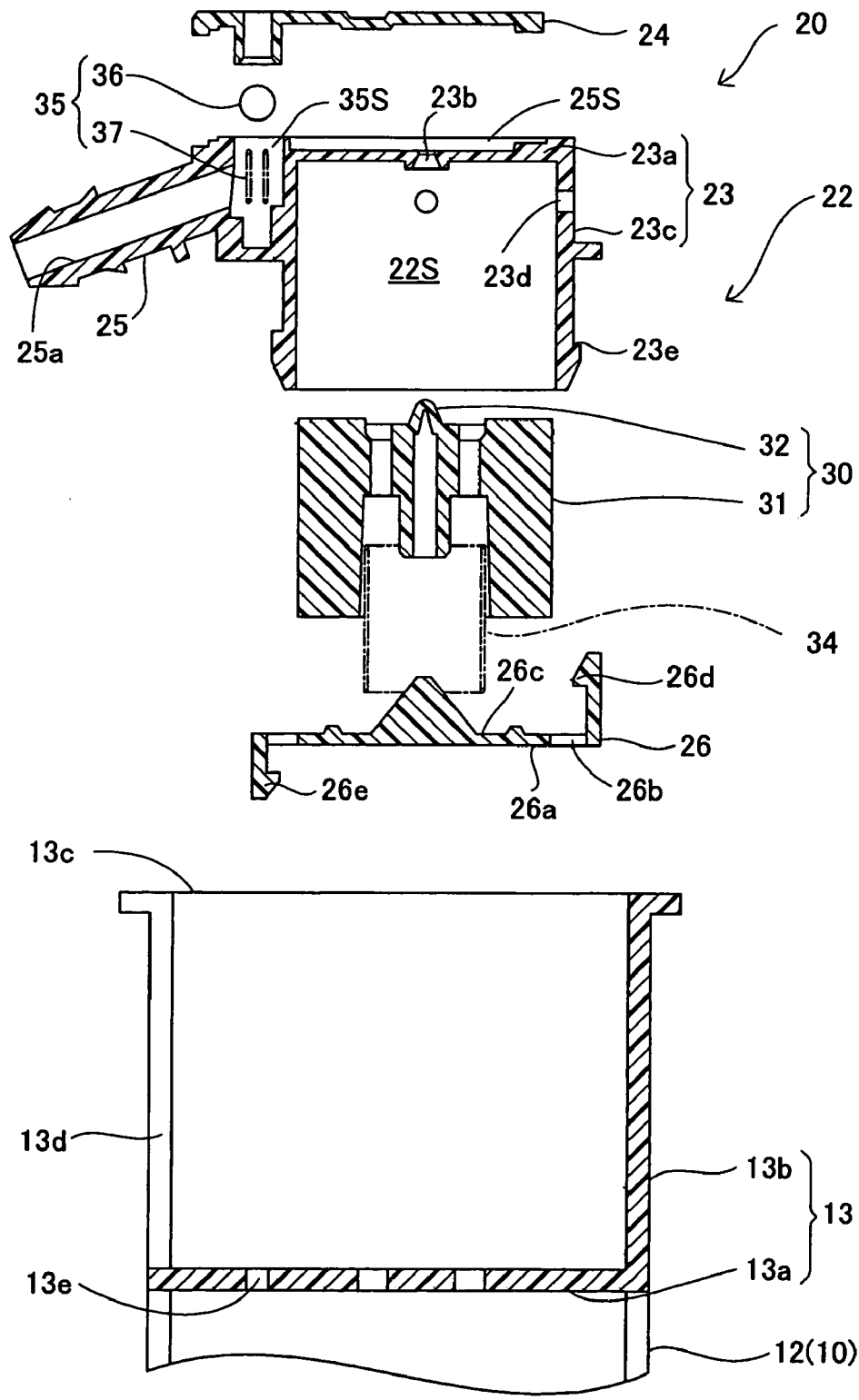
FIG. 5 is an exploded sectional view of the fuel cutoff valve.

FIG. 4 is a side view depicting the fuel cutoff valve 20; and FIG. 5 is an exploded sectional view of the fuel cutoff valve 20. The fuel cutoff valve 20 in FIG. 5 has as principal components a casing 22, a float mechanism 30, a spring 34, and a check valve 35. The casing 22 includes a casing body 23 of tubular shape; a top cover 24 attached to the top of the casing body 23 and defining a communicating chamber 25S above the casing body 24; and a bottom cover 26 installed on the bottom of the casing body 23, with the casing body 23 and the bottom cover 26 defining a valve chamber 22S. A connecting passage 23b is formed in the center part of the top wall 23a of the casing body 23, and a vent hole 23d is formed in the side wall 23c. A pipe body part 25 is projected downward at the top of the casing body 23. A pipe passage 25a is defined inside the pipe body part 25, the pipe passage 25a connecting at a first end with fuel tank FT interior via the communicating chamber 25S, the connecting passage 23b, and the valve chamber 22S, and connecting at the other end to a canister side via a tube T (FIG. 2). The bottom cover 26 includes a bottom cover body 26a of circular disk shape; a communication hole 26b formed in the bottom cover body 26a; a spring support portion 26c formed on the upper face of the bottom cover body 26a; a first engaging portion 26d; and a second engaging portion 26e. As shown in FIG. 4, the first engaging portion 26d is formed by claws projected upward at two locations and adapted to engage a valve engaged portion 23e that is constituted by a step portion formed on the side wall of the casing body 23, thereby attaching the bottom cover 26 to the casing body 23. The second engaging portion 26e is adapted to engage with a support engaged portion 13e to secure the fuel cutoff valve 20 to the housing portion 20.

The float mechanism 30 includes a float body 31 housed within the valve chamber 22S, and at the top thereof, a valve portion 32 of substantially conical shape. The valve portion 32 is designed to open or close the connecting passage 23b through rising or falling of the float body 31. The spring 34 is supported on the spring support portion 26c of the bottom cover 26 and urges the float mechanism upward. The check valve 35 serves as a release valve allowing fuel tank internal pressure to escape through a check valve chamber 35S and the pipe passage 25a; it includes a spherical valve body 36, and a spring 37 for urging the valve body 36 towards the closed position.

As shown in FIG. 3, owing to the design of the fuel cutoff valve 20, fuel vapors which have accumulated in the top part of the fuel tank as the fuel level in the fuel tank rises will escape to the canister through the vent hole 23d of the casing 22, the communication hole 26b of the bottom cover 26, the valve chamber 22S, the connecting passage 23b, and the pipe passage 25a. If the fuel level in the fuel tank FT should subsequently reach a prescribed level due to tilting or swaying of the vehicle, fuel will inflow to the valve chamber 22S through the communication hole 26b of the bottom cover 26. This will give rise to buoyancy of the float mechanism 30, causing it to rise so that the valve portion 32 of the float mechanism 30 blocks off the connecting passage 23b, preventing fuel from flowing out towards the canister side.

(4) Attachment Structure for Fuel Cutoff Valve 20 and Support Body 10

Once the parts of the fuel cutoff valve 20 in FIG. 5 have been assembled, it will be secured to the support body 10. Specifically, after housing the valve body 36 and the spring 37 in the check valve chamber 35S at the top of the casing body 23, the top cover 24 will be welded to the top of the casing body 23; then after housing the float mechanism 30 and the spring 34, the bottom cover 26 will be attached to the casing body 23 by engaging the first engaging portion 26d of the bottom cover 26 with the valve engaged portion 23e. The assembled fuel cutoff valve 20 will then be secured to the housing portion 13 by engaging the second engaging portion 26e of the bottom cover 26 with the support engaged portion 13e of the mounting plate 13a of the support body 10.

(5) Working Effects of the Embodiment

The embodiment described above affords the following working effects, in addition to the working effects mentioned above.

(5)-1 The means for securing the fuel cutoff valve 20 to the support body 10 involves integrally forming on the bottom cover 26 the first engaging portion 26d which is adapted to engage the valve engaged portion 23e of the casing body 23, and the second engaging portion 26e which is adapted to engage the support engaged portion 13e of the housing portion 13 of the support body 10. That is, not only is the bottom cover 26 provided with engaging means adapted to engage the casing body 23, but also with engaging means adapted to engage the housing portion 13, so that once the second engaging portion 26e has been engaged with the support engaged portion 13e of the housing portion 13, the fuel cutoff valve 20 can be attached to the housing portion 13 easily by a one-touch operation. Moreover, parts such as screws are not needed to secure the housing portion 13 and the fuel cutoff valve 20, so there are fewer parts as well.

(5)-2 The second engaging portion 26e is a claw that is projected downward from the bottom cover 26; and the second engaged portion is a hole that is formed in the mounting plate 13a and adapted to engage with the claw. That is, by forming the first and second engaging portions in a plate-shaped member like the bottom cover 26, even a readily flexed claw shape can be produced easily.

The present invention is not limited to the embodiment set forth hereinabove, and may be embodied in various modes without departing from the spirit thereof, as shown for example by the following modified embodiment. While the fuel cutoff valve in the preceding embodiment is described as being a rollover valve designed to prevent fuel from spilling out during tilting of the vehicle, no limitation is imposed thereby, and the invention can be implemented in valves of various kinds, such as a full tank limit valve for limiting the fuel to a prescribed level during fueling.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A tank valve unit comprising:
   a support body that is housed inside a fuel tank, and includes a mounting plate having a support engaged portion;
   a fuel cutoff valve that is secured to the support body, and has (i) a casing including a casing body and a bottom cover installed in a bottom part of the casing body, wherein the casing body and the bottom cover define a valve chamber; (ii) a float mechanism adapted to rise and fall depending on a fuel level in the valve chamber, and (iii) a spring adapted to upwardly urge the float mechanism, wherein the bottom cover has (i) a bottom cover body of circular disk shape; (ii) a communication hole formed in the bottom cover body and connecting the fuel tank interior with the valve chamber; (iii) a spring support portion formed on an upper face of the bottom cover body and adapted to support the spring; (iv) a first engaging portion adapted to attach the bottom cover to the casing body through engagement with a valve engaged portion of the casing body; and (v) a second engaging portion adapted to secure the bottom cover to the mounting plate through engagement with the support engaged portion, and the second engaging portion is a readily flexed claw shape that is projected downward from the bottom cover; and the support engaged portion is a hole that is formed in the mounting plate and adapted to flex and engage the claw.

2. The tank valve unit in accordance with claim 1 wherein the valve engaged portion is a steep portion formed on a side wall of the casing body; and the first engaging portion is a claw projecting upward and adapted to engage the step portion.

* * * * *